(12) United States Patent
Betita (10) Patent No.: US 10,542,342 B1
(45) Date of Patent: Jan. 21, 2020

(54) HEADSET WITH STATUS CORD (71) Applicant: Plantronics, Inc., Santa Cruz, CA (US)

(72) Inventor: Stephen Conrad Betita, La Selva Beach, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/103,779

(22) Filed: Aug. 14, 2018

(51) Int. Cl.
| | |
|---|---|
| *H04R 1/10* | (2006.01) |
| *F21V 33/00* | (2006.01) |
| *F21V 8/00* | (2006.01) |
| *G08B 5/36* | (2006.01) |
| *F21Y 115/10* | (2016.01) |

(52) U.S. Cl.
CPC ....... *H04R 1/1033* (2013.01); *F21V 33/0056* (2013.01); *G02B 6/001* (2013.01); *G08B 5/36* (2013.01); *H04R 1/1091* (2013.01); *F21Y 2115/10* (2016.08)

(58) Field of Classification Search
CPC .. H04R 1/1033; H04R 1/1041; H04R 1/1091; H04R 5/033; H04R 1/10; H04R 2420/09; H04R 1/00; H04R 1/1008; G02B 6/001; G02B 6/005; G02B 6/0068; G02B 6/0073; F21V 33/0056; F21V 23/001; F21V 23/06
USPC .................................................. 381/74, 309
See application file for complete search history.

(56) References Cited

U.S. PATENT DOCUMENTS

| | | | |
|---|---|---|---|
| 7,121,707 B2 | 10/2006 | Currie et al. | |
| 7,163,326 B2 | 1/2007 | Cassarly et al. | |
| 7,952,487 B2 | 5/2011 | Montebovi | |
| 9,803,852 B1 | 10/2017 | Clacken | |
| 2015/0024804 A1* | 1/2015 | Davis ................. | H04M 1/6066 455/569.1 |
| 2015/0071456 A1 | 3/2015 | Steenkamp | |
| 2015/0373449 A1* | 12/2015 | Jackson ............... | H04R 1/1033 381/74 |
| 2017/0211803 A1* | 7/2017 | Wang ................... | H01B 11/125 |

OTHER PUBLICATIONS

Broida ("Get the Coolest Lightning Cable Ever", Jul. 29, 2015) https://www.cnet.com/news/get-the-coolest-lightning-cable-ever-for-11-99/ (Year: 2015).*

(Continued)

*Primary Examiner* — Yogeshkumar Patel
(74) *Attorney, Agent, or Firm* — Haynes Beffel & Wolfeld LLP (57) ABSTRACT

A headset includes an ear level module including a speaker and a receiver which drives the speaker. A cord configured to carry control signals and audio signals for the receiver is connected to the headset. An illumination source is disposed along a segment of the cord spanning a range selected to be visible to the wearer and persons near the wearer. The cord includes a plurality of wires configured to carry audio signals and control signals, and one or more wires connected to the illumination source configured to carry light control signals from a controller. The controller includes circuitry responsive to control signals transmitted on the cord to provide light control signals to cause the illumination source to produce status semaphores indicating status of use of the headset.

19 Claims, 5 Drawing Sheets

(56) References Cited

OTHER PUBLICATIONS

Broida, "Get the Coolest Lighting Cable Ever for $11.99," found at URL https://www.cnet.com/news/get-the-coolest-lightning-cable-ever-for-11-99/>, 7 pages, Jul. 29, 2015.

Unknown, "Modal 3' Micro USB Charge-and-Sync Cable—Red," found at URL <https://www.bestbuy.com/site/modal-3-micro-usb-charge-and-sync-cable-red/4205006.p?skuId=4205006>, 3 pages, found on Jan. 8, 2018.

Unknown, "Blackwire 5200 Series Enhanced Compatibility. Exception Comfort.," found at URL <https://www.headsetsdirect.com/pdf/blackwire-5200-ps-en.pdf>, 2 pages, 2017.

Unknown, "Blackwire® C710M™/C720M™ Corded USB headset with Bluetooth® User Guide," founds at URL <https://www.plantronics.com/content/dam/plantronics/documents-and-guides/en_us/user-guides/blackwire-c710-c720-ug.pdf>, 23 pages, Oct. 2012.

Unknown, "SupraPlus®," found at URL <https://www.plantronics.com/content/dam/plantronics/documents-and-guides/en/product-sheets/supraplus-wideband-ps.pdf>, 1 page, 2010.

Unknown, "Plantronics, SupraPlus® wideband USB HW251N-USB User Guide," found at URL <https://www.plantronics.com/content/dam/plantronics/documents-and-guides/en/user-guides/supraplus-wideband-usb-ug.pdf>,5 pages, 2007.

\* cited by examiner

HEADSET WITH STATUS CORD

BACKGROUND

Field

The present invention relates to audio headsets and techniques for displaying status information relevant to use of the headset.

Description of Related Art

Audio headsets are utilized in a variety of settings, including to support telephone calls in call centers, to allow hands-free tasks in office settings, for privately playing music or other streaming audio, and for other uses and combinations of uses. Headsets have been provided that include status lights on the ear level module. Status lights on the ear level module typically cannot be seen by the wearer.

Other headsets have placed an LED or other status light on an in-line controller or light module on a cord connected to the headset. However, in some cases status lights in these locations cannot be seen by both the wearer and a person walking up to the wearer, for instance if it is on at belt level below a desk or otherwise obscured.

It is desirable to provide a technology to display status that is viewable by both the wearer and the people around them.

SUMMARY

An audio headset is described that comprises a speaker and a cord configured to carry audio signals for the speaker. An illumination source, such as a string of LEDs or a light pipe with emission surfaces, is disposed along a segment of the cord. A controller is coupled to the cord and the illumination source, and includes circuitry to detect control signals transmitted on the cord and to cause the illumination source to produce status semaphores indicating status of use of the headset. The illumination source can comprise a plurality of lights or emission surfaces arranged in a periodic pattern or continuously across the segment of the cord.

The segment of the cord in which the illumination source is disposed can comprise a majority of the length of the cord. In general, the segment of the cord should be long enough to enable both the wearer and persons near the wearer to see the semaphores when the cord is in most likely positions while the headset is being worn. For example, the segment can span a range along the cord having a length of at least 15 cm.

Examples of status semaphores can include combinations of colors and temporal patterns of illumination of the illumination source. Different semaphores based on temporal patterns, color patterns, and combinations of temporal and color patterns, that can be produced include semaphores indicating states of use including incoming calls, active calls, on hold status for telephone calls, headset idle, streaming audio active, streaming audio pause and mute. Also device firmware update status can be indicated by a unique semaphore.

In various examples described herein, the controller is mounted in a capsule on the headset, or on an in-line capsule connected to the cord.

Examples of cords described herein include a plurality of wires configured to carry audio signals and control signals data, such as Universal Serial Bus USB standard compliant cords, FireWire standard compliant cords, special purpose cords and so on.

Also, cords described herein include one or more wires connected to the illumination source configured to carry light control signals from the controller. In some embodiments, the cords also carry electrical power from a power source such as a battery or host system for connection to the illumination source.

Other aspects and advantages of the present invention can be seen on review of the drawings, the detailed description and the claims, which follow.

DETAILED DESCRIPTION

A detailed description of embodiments of the present invention is provided with reference to the FIGS. 1-7.

Figure 1:
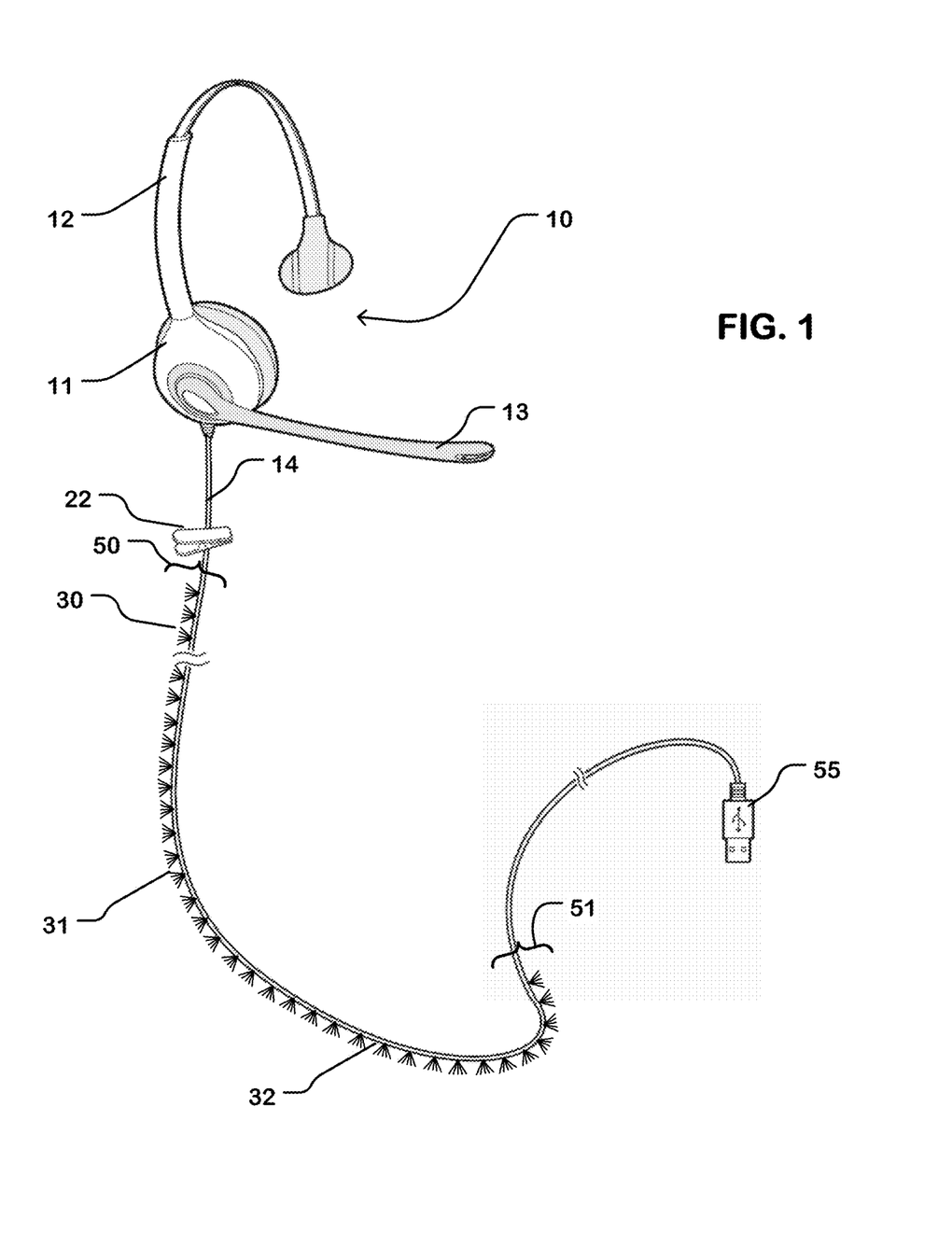
FIG. 1 is a drawing of a headset including a cord having a status illumination source distributed along a segment of the cord.

FIG. 1 illustrates a headset 10 including a headset status cord 14 with an illumination source (sequence of lights e.g. 30, 31, 32) disposed along a segment of the cord 14, the segment delineated by brackets 50 and 51. The headset status cord 14 can comprise wiring compliant with a USB standard, and include a USB compliant plug 55. For other cord standards, different plug and wiring configurations are utilized. The headset status cord 14 can be fixed to the headset in a manner not removable in normal use, or by a plug and receptacle or threaded coupling in removable embodiments.

In this example, the headset 10 includes an ear level module 11 including a speaker, an ear cushion, and receiver circuitry which processes control signals and audio signals carried on the cord 14 and drives the speaker. Also, in this example, a boom 13 including a microphone is coupled to the ear level module 11 at an adjustable turret. Also, an adjustable headband 12 is coupled to the ear level module 11 to secure the headset 10 on a user's head. Also, in this example, a clothing clip 22 is shown on the cord 14.

The ear level module 11 also includes a controller operatively coupled to the cord 14 and to the illumination source. The controller includes circuitry responsive to control signals transmitted on the cord to cause the illumination source to produce status semaphores indicating status of use of the headset. In other embodiments, the controller may be at a distal end of the cord 14, such as in a module coupled to the plug 55.

In FIG. 1, the illumination source comprises a sequence of lights (e.g. 30, 31, 32) spanning a range from bracket 50 to bracket 51 along a majority of the length of the cord 14 from the ear level module 11 to the plug 55. The range spanned by the sequence of lights preferably has a length of at least 15 cm and is disposed along the cord in a location selected for use as a status indicator not to be obscured during normal use.

An illumination source spans a segment of a cord for the purposes of the present description, when it generates or provides light at the boundaries of the segment, and provides light at locations disposed within the boundaries of the segment or continuously within the boundaries of the segment. For example, an illumination source that includes a plurality of LEDs spans a segment when there is a first LED at a proximal boundary of the segment, and a second LED at a distal boundary of the segment, and a plurality of LEDs disposed between the first and second LEDs. The lights can be disposed in a periodic pattern, such as having lights equally spaced between the boundaries of the segment in some embodiments. In other embodiments, other patterns of illumination can be used in an illumination source that spans a segment of the cord. Other examples of illumination sources are discussed below with respect to FIGS. 6 and 7. In a given example, the lights in the segment can be periodically spaced apart by 1 mm, 5 mm, by 10 mm, by 20 mm and so on, as suits a particular embodiment. Alternatively, the lights can be positioned so as to appear as one continuous line of lights.

A plurality of status semaphores can be utilized. For example, the controller can be configured to utilize semaphores as follows:
1. Flashing blue, pause, and then repeat again for incoming call.
2. Solid blue for active call.
3. Solid red for muted call.
4. Constant flashing blue for a call on hold.
5. Solid purple for steaming media.
6. Off when headset is idle.
7. Flashing red for device firmware update DFU.

In other embodiments, the headset may comprise one or more corded earbuds, without an adjustable headband for example. In earbud embodiments, the controller or portions of the controller may be disposed inside the earbud capsule, or using an in-line module on the cord.

Figure 2:
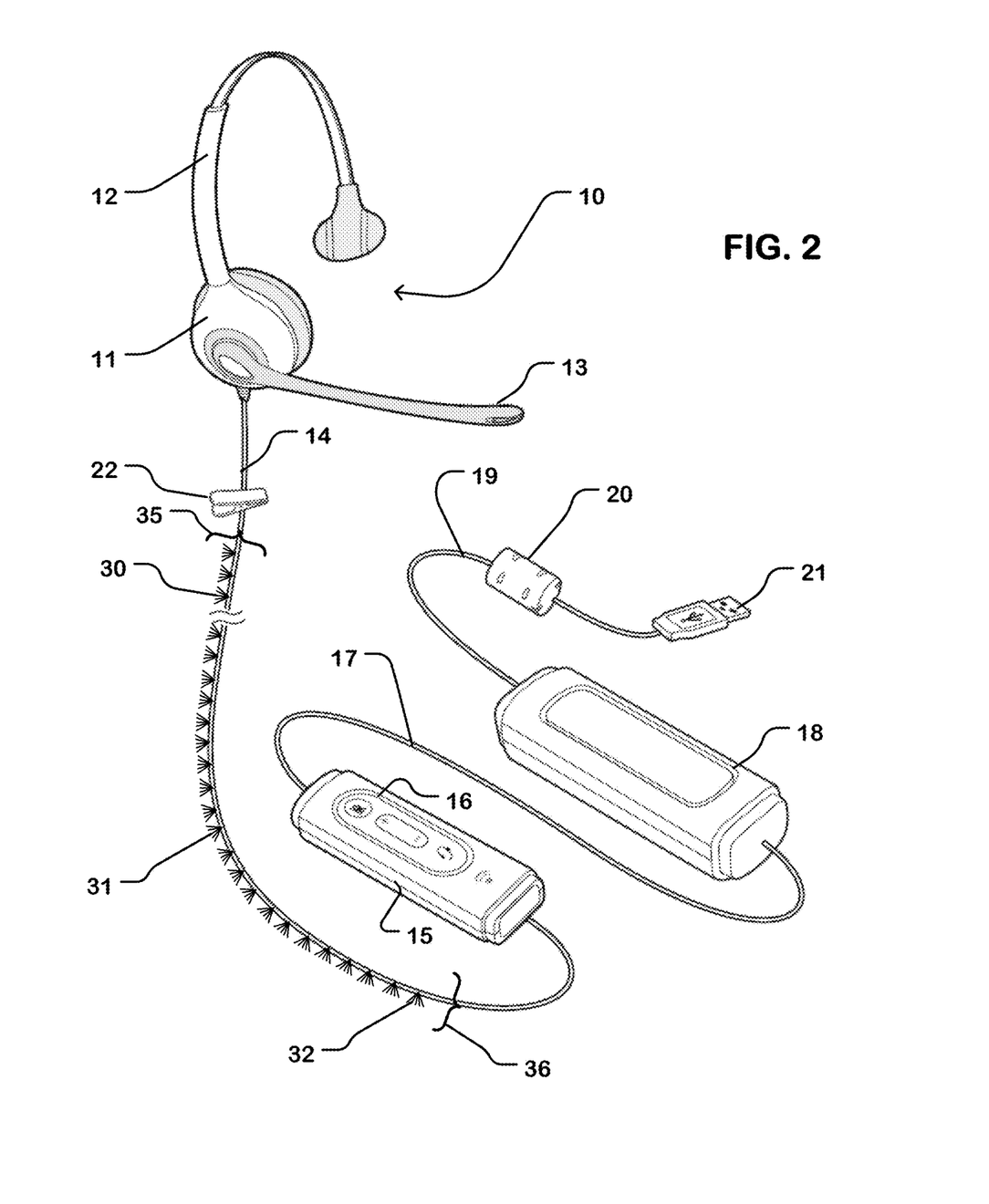
FIG. 2 is a drawing of a headset including a cord with in-line modules, and a status illumination source distributed along a segment of the cord.

FIG. 2 illustrates an example in which the headset status cord 14 includes an in-line controller module 15 that includes a user interface 16, and an in-line adapter module 18 which acts as an adapter for converting a configuration of wires coupled to the in-line controller module 15 into a configuration suitable for connection to a host device, such as a USB compliant host.

Reference numerals used in FIG. 1 are used in FIG. 2 for like components that are not described again.

In the example of FIG. 2, the illumination source spans a segment of the cord, delineated by brackets 35, 36 between the ear level module 11 and the in-line controller module 15. A portion 17 of the cord extends between the in-line controller module 15 and the in-line adapter module 18. Additional portion 19 of the cord extends between the in-line adapter module 18 and the plug 21. An interference suppression module 20 can be coupled to the portion 19 of the cord.

In this example, the controller for the illumination source can include circuitry in the in-line controller module 15, or in the in-line adapter module 18 that is operable to detect and respond to control signals on the cord that indicate status of use of the headset, to cause the illumination source to produce the suitable semaphores. In the example of FIG. 2, the segment between brackets 35 and 36, through which the illumination source spans, includes a majority of the portion of the cord 14 between the ear level module 11 and the in-line controller module 15. As mentioned above, the configuration shown in FIG. 2 can also be implemented using earbuds.

Figure 3:
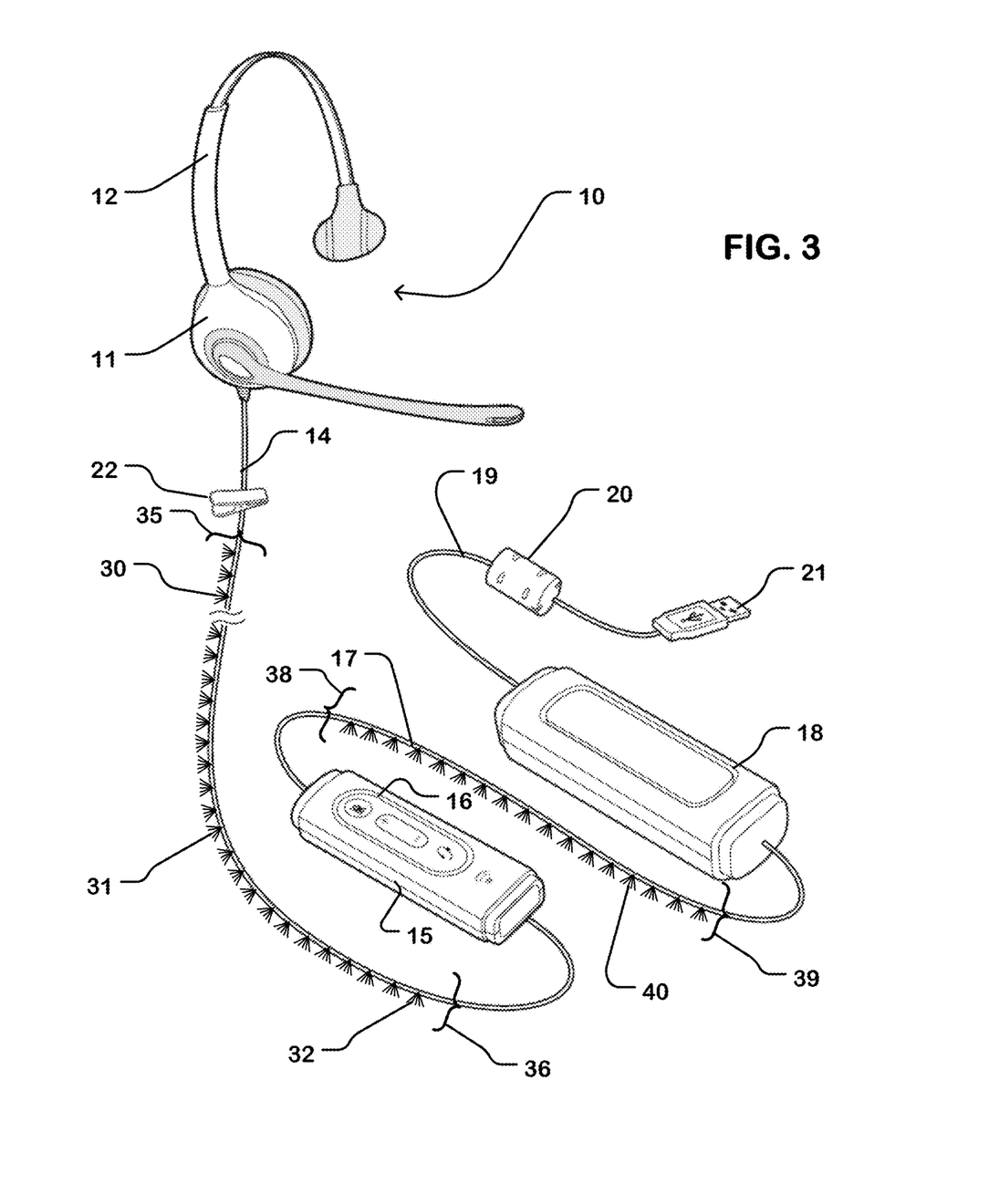
FIG. 3 is a drawing of a headset including a cord with in-line modules, and a status illumination source distributed along multiple segments of the cord.

FIG. 3 illustrates an alternative embodiment in which the headset status cord includes an illumination source spanning a plurality of segments of the cord. In this example, the plurality of segments includes lights in the segment delineated by brackets 35, 36 and lights (e.g. 40) in a segment delineated by brackets 38, 39 in the portion 17 of the cord between the in-line controller module 15 and the in-line adapter module 18. As suggested, the illumination source can also span a segment between the in-line adapter module 18 and the plug 21 in some embodiments.

Figure 4:
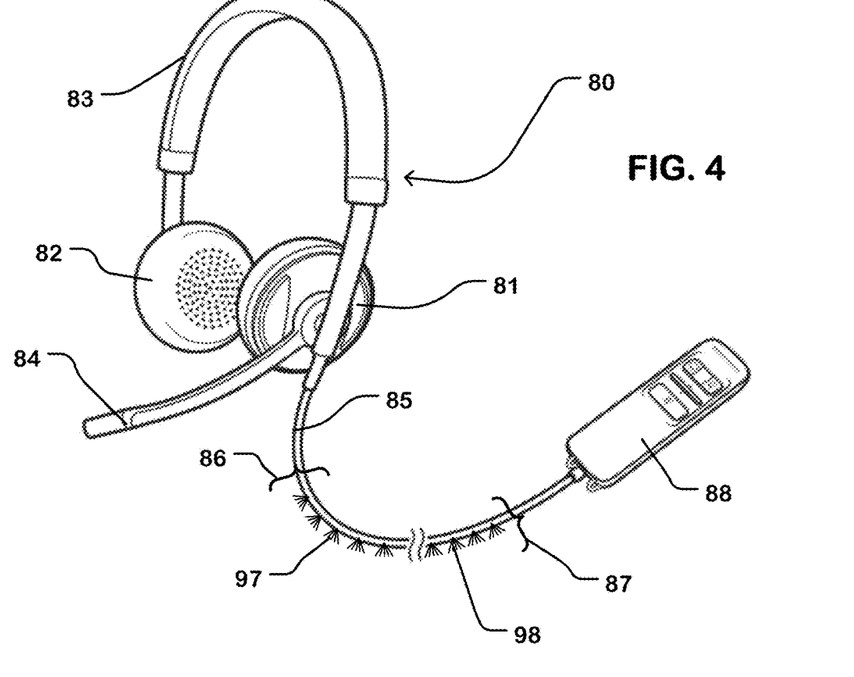
FIG. 4 is a drawing of a stereo headset including a cord with a status illumination source distributed along a segment of the cord.

FIG. 4 illustrates an alternative embodiment, for a stereo headset 80. In this example, the headset 80 includes a first ear level module 81 and a second ear level module 82 connected by an adjustable headband 83. Also, a microphone boom 84 is coupled to the first ear level module 81. A headset status cord 85 is coupled to the headset 80, and includes an illumination source (e.g. lights 97, 98) that spans a segment delineated by brackets 86, 87 of the cord 85. In this example, the cord 85 is coupled to an in-line module 88. The in-line module 88 can be coupled to additional cord segment including a plug for a host device.

In the embodiment of FIG. 4, and in the embodiment of FIGS. 2 and 3 and other similar embodiments, an in-line module may include circuitry providing a wireless communication link to a host device, in place of a segment of the cord including a physical plug.

Figure 5:
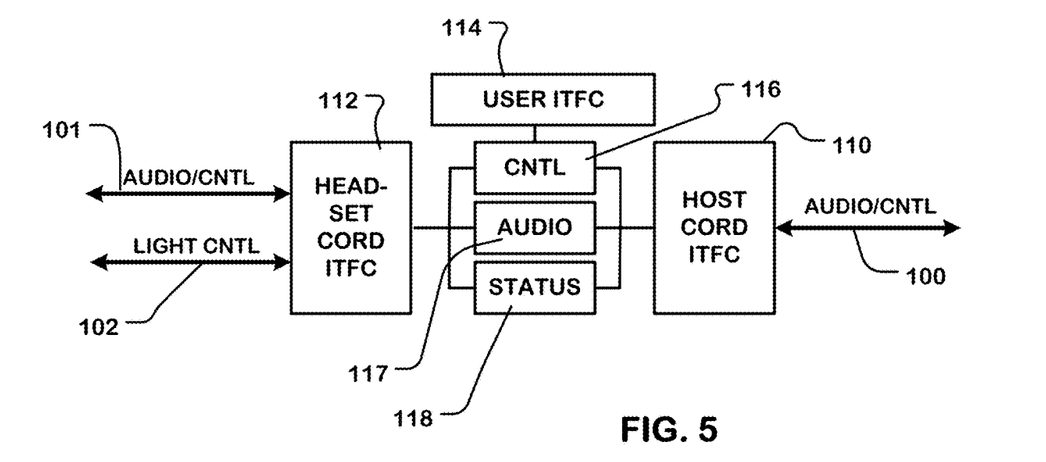
FIG. 5 is a block diagram of a controller operatively coupled to the cord and the illumination source for use in headsets including status indicating cords as described herein.

FIG. 5 is a diagram of a controller operatively coupled to the headset status cord and the illumination source of the headset status cord. In this example, the controller includes a host cord interface 110 on a host side that is connected to audio signals and control signals on line 100 which provides a channel to a host device, such as a smart phone, a personal computer, or the like. A host is a device in this example which can be used to support telephone calls, audio streaming, and other uses. The controller includes a headset cord interface 112 connected to pass audio signals and control signals on line 101 which provides a channel to the receiver in the headset ear level module. The headset cord interface 112 is also connected to pass light control signals on line 102 which provides a channel to the illumination source in the headset status cord. Also, the controller includes a user interface 114 in this example, which can be disposed on an ear level module of the headset, or on an in-line module. The user interface 114 can include buttons and displays usable to control operation of the headset and produce control signals that are communicated on the headset status cord to the host device and to the headset receiver.

FIG. 5 schematically illustrates three elements of the controller, including circuitry 116 for parsing control signals from the line 100 (or other host channel) and from the user interface 114. The circuitry 116 can parse data being transmitted on the cord according to a communication standard, such as the USB standard or others being utilized by the headset. Also, the controller includes circuitry 117 for transferring audio signals between the headset and the host on lines 101 and 100. Also the controller in this example includes status circuitry 118, which can include circuitry that detects and processes control signals parsed by circuitry 116 to indicate status of the use of the headset, and to define semaphores to be displayed using the illumination source. The status circuitry 118 can generate the light control signals to be provided on wire 102 to cause the illumination source to provide the appropriate semaphores.

Of course, the circuitry of the controller can be implemented in a variety of configurations.

In operation, the controller monitors communications on the headset status cord to determine a status of use of the headset. The status of use can be determined by parsing control signals being communicated on the cord, and applying state logic to determine status and a lookup table to select an appropriate semaphore for the headset status cord. The controller then generates the light control signals and applies them to the illumination source to generate the chosen semaphore.

Figure 6:
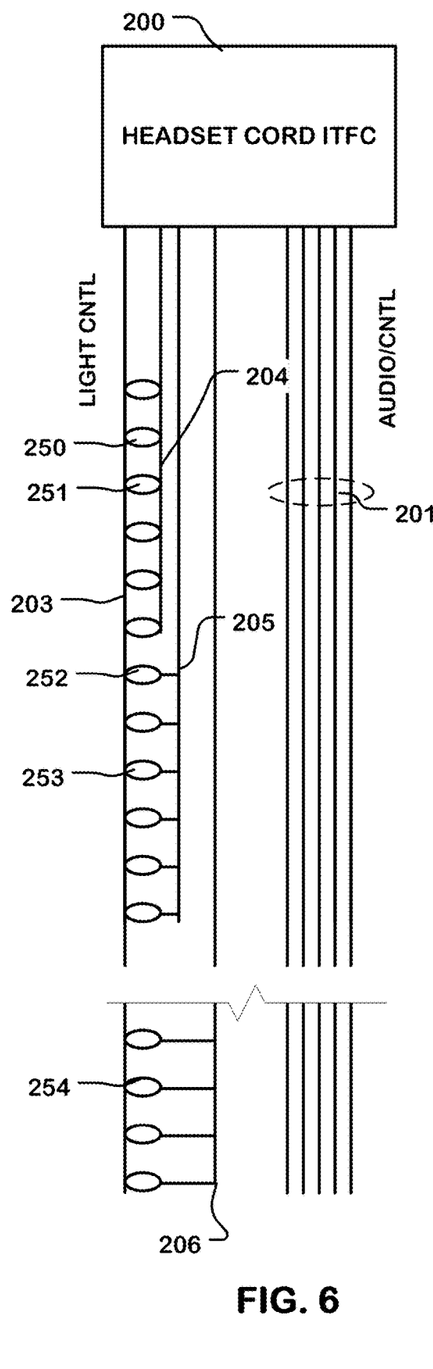
FIG. 6 is a simplified diagram showing a configuration of a cord usable in a headset as described herein comprising a periodic sequence of LEDs.

FIG. 6 illustrates a configuration of a headset status cord according to one embodiment. In this example, a headset cord interface 200, such as that discussed with respect to FIG. 5, is coupled to a plurality of wires 201 that are configured to carry audio and control data on the cord, and a plurality of light control wires 203, 204, 205, 206. In some embodiments, one or more of the wires can be replaced using optical fibers or other waveguides.

In this example, a plurality of LEDs (e.g. 250-254) are arranged along a segment of the cord. The LEDs can comprise single color LEDs, or multiple color LEDs as suits a particular embodiment. Light control wires can include one wire for each LED and a ground wire providing for individual control of the LEDs in some embodiments.

In the illustrated embodiment, the light control wires include one wire for each of a plurality of sets of LEDs and a ground wire, enabling individual control of each of the sets of LEDs. Thus, the light control wire 203 is a ground wire in this example. The light control wire 204 is coupled to a set of six LEDs. The light control wire 205 is coupled to a second set of six LEDs. Light control wire 206 is coupled to a final set of six LEDs. As can be seen, the LEDs can be grouped as desired in a particular implementation. Also, in other embodiments, the control wires can be coupled to a set of LEDs that are interleaved or arranged in other patterns.

The number and operation of wires in the plurality of wires 201 can be determined by the protocol of the audio/control bus being utilized by the headset.

Figure 7:
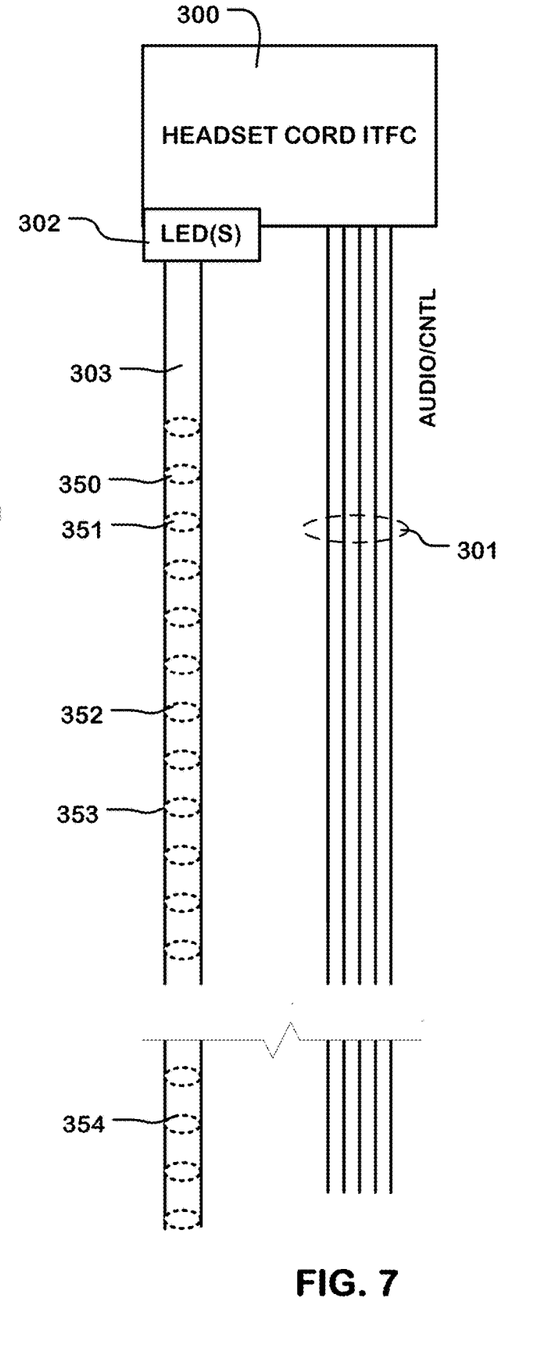
FIG. 7 is a simplified diagram showing a configuration of a cord usable in a headset as described herein, comprising a light pipe with a periodic sequence of emission surfaces disposed along a segment of the cord.

FIG. 7 illustrates an alternative configuration of a headset status cord. In this example, a headset cord interface 300, such as that discussed with respect to FIG. 5 is coupled to a plurality of wires 301 that are configured to carry audio and control data on the cord. The number and operation of wires in the plurality of wires 301 can be determined by the protocol of the audio/control bus being utilized by the headset.

Also, the headset cord interface 300 is coupled to an illumination source that includes a light pipe 303 and a LED or set of LEDs 302 optically coupled to the light pipe 303. The light control wires of FIG. 5 are disposed inside the LED or set of LEDs 302 for the purposes of this illustration, and control the LED or LEDs 302.

The light pipe comprises a flexible waveguide, such as an optical fiber, that includes a plurality of emission surfaces (e.g. 350-354) providing lights arranged along a segment of the cord. The pattern of the emission surfaces can be arranged as suits a particular implementation, as discussed above. In this example, the controller controls the LED or LEDs 302 to produce different colors and temporal patterns of light through the light pipe 303, causing light to be emitted at the emission surfaces according to the selected semaphores. In other embodiments, the light pipe can include an emission surface that extends the entire length of the segment. In some embodiments, there can be multiple light pipes disposed on the cord to provide other patterns of illumination.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A headset, comprising:
   a speaker;
   a cord configured to carry audio signals for the speaker;
   an illumination source disposed along a segment of the cord; and
   a controller operatively coupled to the cord and the illumination source, including circuitry responsive to signals transmitted on the cord to cause the illumination source to produce status semaphores indicating status of use of the headset; wherein the controller is configured to generate a unique semaphore for device firmware update in progress status.

2. The headset of claim 1, wherein the illumination source comprises a set of light emitting diodes disposed along the segment of the cord.

3. The headset of claim 1, wherein the illumination source comprises a light pipe having an emitting surface or set of emitting surfaces disposed along the segment of the cord, and a light optically coupled to the light pipe.

4. The headset of claim 1, wherein the status semaphores include combinations of colors and temporal patterns of illumination of the illumination source.

5. The headset of claim 1, wherein the controller is mounted on the headset.

6. The headset of claim 1, wherein the controller is mounted in-line on the cord.

7. The headset of claim 1, wherein the segment of the cord in which the illumination source is disposed spans a range having a length of at least 15 cm.

8. The headset of claim 1, wherein the cord includes a plurality of wires configured to carry audio signals and control signals, and one or more wires connected to the illumination source configured to carry light control signals from the controller.

9. The headset of claim 1, wherein the controller is configured to generate different semaphores for use statuses including incoming call, active call, on hold, idle headset, streaming audio active, streaming audio pause and mute.

10. A headset, comprising:
    an ear level module including a speaker and a receiver which drives the speaker;
    a cord configured to carry control signals and audio signals for the receiver;
    an illumination source disposed along a segment of the cord spanning a range having a length of at least 15 cm;
    the cord including a plurality of wires configured to carry audio signals and control signals, and one or more wires connected to the illumination source configured to carry light control signals; and a controller operatively coupled to the cord and the illumination source, including circuitry responsive to control signals transmitted on the cord to provide light control signals to cause the illumination source to produce status semaphores indicating status of use of the headset; wherein the controller is configured to generate a unique semaphore for device firmware update in progress status.

11. The headset of claim 10, wherein the illumination source comprises a set of light emitting diodes disposed along the segment of the cord.

12. The headset of claim 10, wherein the illumination source comprises a light pipe having an emitting surface or set of emitting surfaces disposed along the segment of the cord, and a light optically coupled to the light pipe.

13. The headset of claim 10, wherein the status semaphores include combinations of colors and temporal patterns of illumination of the illumination source.

14. The headset of claim 10, wherein the controller is mounted on the headset.

15. The headset of claim 10, wherein the controller is mounted in-line on the cord.

16. The headset of claim 10, wherein the controller is configured to generate different semaphores for use statuses including incoming call, active call, on hold, idle headset, streaming audio active, streaming audio pause and mute.

17. A headset cord, comprising:
a plurality of wires configured to carry audio signals and control signals, and one or more wires connected to an illumination source configured to carry light control signals; and
an illumination source disposed along a segment of the cord spanning a range having a length of at least 15 cm, the illumination source responsive to signals on the cord to produce status semaphores indicating status of use of the headset, including a unique semaphore for device firmware update in progress status.

18. The headset cord of claim 17, wherein the illumination source comprises a set of light emitting diodes disposed along the segment of the cord.

19. The headset cord of claim 17, wherein the illumination source comprises a light pipe having an emitting surface or set of emitting surfaces disposed along the segment of the cord, and a light optically coupled to the light pipe.

* * * * *